United States Patent
Huang et al.

(10) Patent No.: US 9,502,930 B2
(45) Date of Patent: Nov. 22, 2016

(54) MOTOR ROTOR AND MOTOR HAVING SAME

(75) Inventors: Hui Huang, Guangdong (CN); Yusheng Hu, Guangdong (CN); Dongsuo Chen, Guangdong (CN); Huajie Chen, Guangdong (CN); Yong Xiao, Guangdong (CN); Xueying Zeng, Guangdong (CN); Wenming Zhang, Guangdong (CN)

(73) Assignees: Gree Electric Appliances, Inc. of Zhuhai, Zhuhai, Guangdong (CN); Gree Green Refrigeration Technology Center Co., Ltd. of Zhuhai, Zhuhai, Guangdong (CN)

( * ) Notice: Subject to any disclaimer, the term of this patent is extended or adjusted under 35 U.S.C. 154(b) by 382 days.

(21) Appl. No.: 14/235,604

(22) PCT Filed: Aug. 29, 2011

(86) PCT No.: PCT/CN2011/079059
§ 371 (c)(1),
(2), (4) Date: Jan. 28, 2014

(87) PCT Pub. No.: WO2013/020310
PCT Pub. Date: Feb. 14, 2013

(65) Prior Publication Data
US 2014/0191607 A1    Jul. 10, 2014

(30) Foreign Application Priority Data
Aug. 5, 2011    (CN) .......................... 2011 1 0224391

(51) Int. Cl.
*H02K 1/27* (2006.01)
*H02K 1/24* (2006.01)

(52) U.S. Cl.
CPC ................ *H02K 1/27* (2013.01); *H02K 1/246* (2013.01); *H02K 1/2766* (2013.01); *H02K 2213/03* (2013.01)

(58) Field of Classification Search
CPC ............ H02K 1/14; H02K 1/27; H02K 1/22; H02K 1/32; H02K 21/12; H02K 21/14; H02K 29/03

USPC ........................................ 310/156.53–156.57
See application file for complete search history.

(56) References Cited

U.S. PATENT DOCUMENTS 4,358,697 A    11/1982  Liu et al.
4,924,130 A    5/1990   Fratta
(Continued)

FOREIGN PATENT DOCUMENTS

CN    1149778     5/1997
CN    1243351 A   2/2000
(Continued)

OTHER PUBLICATIONS

International Search Report issued by the State Intellectual Property Office of the P.R. China (Chinese language), dated Apr. 11, 2012, for related International Application No. PCT/CN2011/079059; 5 pages.
(Continued)

*Primary Examiner* — Tran Nguyen
(74) *Attorney, Agent, or Firm* — Faegre Baker Daniels LLP

(57) ABSTRACT

A motor rotor includes an iron core and permanent magnets provided inside the iron core. The iron core is provided with sets of mounting grooves on the iron core in the peripheral direction of the iron core, each set of mounting grooves having two or more mounting grooves provided intermittently in the radial direction of the iron core. There are sets of permanent magnets, the individual permanent magnet of each set of permanent magnets correspondingly being embedded into the individual mounting grooves of each set of mounting grooves; there is an island region between the outermost layer of mounting grooves and the periphery of the iron core, and an enhancing hole is provided in the island region, an enhancing rod being provided in the enhancing hole. A motor includes a motor stator and the motor rotor, with the motor rotor provided inside the motor stator.

7 Claims, 4 Drawing Sheets

(56) References Cited

U.S. PATENT DOCUMENTS

| | | | |
|---|---|---|---|
| 5,818,140 | A | 10/1998 | Vagati |
| 5,903,080 | A | 5/1999 | Nashiki |
| 5,945,760 | A | 8/1999 | Honda et al. |
| 6,218,753 | B1 | 4/2001 | Asano et al. |
| 6,239,526 | B1 | 5/2001 | Oh et al. |
| 6,630,762 | B2 | 10/2003 | Naito |
| 6,703,744 | B2 | 3/2004 | Yoshinaga et al. |
| 6,815,859 | B2 | 11/2004 | Sakuma et al. |
| 6,836,045 | B2 | 12/2004 | Murakami et al. |
| 7,019,426 | B2 | 3/2006 | Mori |
| 7,902,710 | B2 | 3/2011 | Han et al. |
| 7,939,982 | B2 | 5/2011 | Horst |
| 7,981,359 | B2 | 7/2011 | Masuzawa et al. |
| 8,772,994 | B2 | 7/2014 | Feng |
| 2002/0089251 | A1 | 7/2002 | Tajima et al. |
| 2002/0153796 | A1 | 10/2002 | Yoshinaga |
| 2002/0175583 | A1 | 11/2002 | Kikuchi |
| 2003/0030343 | A1 | 2/2003 | Naito |
| 2003/0094875 | A1 | 5/2003 | Sakuma |
| 2005/0110355 | A1 | 5/2005 | Sakuma |
| 2006/0103254 | A1* | 5/2006 | Horst ............... H02K 1/276 310/156.53 |
| 2006/0145561 | A1 | 7/2006 | Sakuma |
| 2007/0096579 | A1 | 5/2007 | Aydin et al. |
| 2010/0052455 | A1 | 3/2010 | Feng |
| 2010/0141076 | A1 | 6/2010 | Blissenbach |
| 2014/0152139 | A1 | 6/2014 | Huang |

FOREIGN PATENT DOCUMENTS

| | | | |
|---|---|---|---|
| CN | 1158741 | | 3/2001 |
| CN | 1388625 | | 1/2003 |
| CN | 1405948 | | 3/2003 |
| CN | 2560153 | | 7/2003 |
| CN | 1505239 | | 6/2004 |
| CN | 2681433 | Y | 2/2005 |
| CN | 101026318 | | 8/2007 |
| CN | 101304204 | | 11/2008 |
| CN | 101359847 | A | 2/2009 |
| CN | 101488679 | A | 7/2009 |
| CN | 101714805 | | 5/2010 |
| CN | 101777809 | | 7/2010 |
| CN | 102111051 | | 6/2011 |
| CN | 202142924 | | 2/2012 |
| CN | 202142925 | U | 2/2012 |
| CN | 202142926 | | 2/2012 |
| CN | 202145610 | | 2/2012 |
| CN | 202145611 | | 2/2012 |
| CN | 202260714 | | 5/2012 |
| CN | 102769365 | | 11/2012 |
| EP | 0746079 | | 12/1996 |
| EP | 1283581 | | 12/2003 |
| JP | 09233744 | A * | 9/1997 |
| JP | 09308198 | | 11/1997 |
| JP | 11262205 | A * | 9/1999 ............ H02K 1/27 |
| JP | 11-275783 | | 10/1999 |
| JP | 11275783 | A * | 10/1999 |
| JP | 2001178045 | A | 6/2001 |
| JP | 2002272031 | | 9/2002 |
| JP | 2003264974 | | 9/2003 |
| JP | 2009044860 | | 2/2009 |
| JP | 2010213553 | A * | 9/2010 |
| JP | 2010226784 | | 10/2010 |
| JP | 2011083066 | | 4/2011 |

OTHER PUBLICATIONS

International Search Report issued by the State Intellectual Property Office of the P.R. China (English language), dated Apr. 11, 2012, for related International Application No. PCT/CN2011/079059; 4 pages.

International Search Report issued by the State Intellectual Property Office of P.R. China (Chinese language), Nov. 24, 2011, for related International Application No. PCT/CN2011/079181; 3 pages.

English translation of the International Search Report issued by the State Intellectual Property Office of P.R. China, Nov. 24, 2011, for related International Application No. PCT/CN2011/079181; 3 pages.

International Preliminary Report on Patentability and Written Opinion issued by the State Intellectual Property Office of the P.R. China (English language), dated Jan. 28, 2014, for related International Application No. PCT/CN2011/079181; 6 pages.

Written Opinion issued by the State Intellectual Property Office of the P.R. China (Chinese language), dated Nov. 24, 2011, for related International Application No. PCT/CN2011/079181; 4 pages.

English translation of the Written Opinion issued by the State Intellectual Property Office of the P.R. China, dated Nov. 24, 2011, for related International Application No. PCT/CN2011/079181; 4 pages.

International Search Report (Chinese language) issued by the State Intellectual Property Office of the P.R. China, dated Mar. 28, 2012, for related International Application No. PCT/CN2011/079169; 5 pages.

English translation of the International Search Report issued by the State Intellectual Property Office of the P.R. China, dated Mar. 28, 2012, for related International Application No. PCT/CN2011/079169; 3 pages.

International Preliminary Report on Patentability and Written Opinion issued by the State Intellectual Property Office of the P.R. China, dated Feb. 11, 2014, for related International Application No. PCT/CN2011/079169; 6 pages.

Written Opinion (Chinese language) issued by the State Intellectual Property Office of the P.R. China, dated Apr. 26, 2012, for related International Application No. PCT/CN2011/079169; 5 pages.

English translation of the Written Opinion issued by the State Intellectual Property Office of the P.R. China, dated Apr. 26, 2012, for related International Application No. PCT/CN2011/079169; 6 pages.

International Search Report issued by the State Intellectual Property Office of the P.R. China (Chinese language), dated Apr. 11 2012, for related International Application No. PCT/CN2011/079062; 6 pages.

English translation of the International Search Report issued by the State Intellectual Property Office of the P.R. China, dated Apr. 11 2012, for related International Application No. PCT/CN2011/079062; 4 pages.

International Preliminary Report on Patentability and Written Opinion issued by the State Intellectual Property Office of the P.R. China, dated Feb. 11, 2014, for related International Application No. PCT/CN2011/079062; 6 pages.

Written Opinion (Chinese language) issued by the State Intellectual Property Office of the P.R. China, dated May 17, 2012, for related International Application No. PCT/CN2011/079062; 5 pages.

English translation of the Written Opinion issued by the State Intellectual Property Office of the P.R. China, dated May 17, 2012, for related International Application No. PCT/CN2011/079062; 8 pages.

International Preliminary Report on Patentability and Written Opinion issued by the State Intellectual Property Office of the P.R. China, dated Feb. 11, 2014, for related International Application No. PCT/CN2011/079059; 6 pages.

Written Opinion (Chinese language) issued by the State Intellectual Property Office of the P.R. China, dated May 3, 2012, for related International Application No. PCT/CN2011/079059; 5 pages.

English translation of the Written Opinion issued by the State Intellectual Property Office of the P.R. China, dated May 23, 2012, for related International Application No. PCT/CN2011/079059; 8 pages.

International Search Report (Chinese language) issued by the State Intellectual Property Office of the P.R. China, dated Apr. 4, 2012, for related International Application No. PCT/CN2011/079064; 5 pages.

(56) References Cited

OTHER PUBLICATIONS

English translation of the International Search Report issued by the State Intellectual Property Office of the P.R. China, dated Apr. 4, 2012, for related International Application No. PCT/CN2011/079064; 3 pages.
International Preliminary Report on Patentability and Written Opinion issued by the State Intellectual Property Office of the P.R. China (with English translation), dated Feb. 11, 2014, for related International Application No. PCT/CN2011/079064; 15 pgs.
Written Opinion issued by the State Intellectual Property Office of the P.R. China (Chinese language), dated May 10, 2014, for related International Application No. PCT/CN2011/079064; 5 pages.
English translation of the Written Opinion issued by the State Intellectual Property Office of the P.R. China, dated May 10, 2012, for related International Application No. PCT/CN2011/079064; 8 pages.
International Search Report issued by the State Intellectual Property Office of the P.R. China (Chinese language), dated Apr. 1, 2012, for related International Application No. PCT/CN2011/079060; 4 pages.
English translation of the International Search Report issued by the State Intellectual Property Office of the P.R. China, dated Apr. 1, 2012, for related International Application No. PCT/CN2011/079060; 2 pages.
International Preliminary Report on Patentability and Written Opinion issued by the State Intellectual Property Office of the P.R. China, dated Feb. 11, 2014, for related International Application No. PCT/CN2011/079060; 4 pages.
Written Opinion (Chinese language) issued by the State Intellectual Property Office of the P.R. China, dated May 10, 2012, for related International Application No. PCT/CN2011/079060; 3 pages.
English translation of the Written Opinion issued by the State Intellectual Property Office of the P.R. China, dated May 10, 2012, for related International Application No. PCT/CN2011/079060; 4 pages.
First Examination Report (Chinese language) issued by the State Intellectual Property Office of the People's Republic of China, dated Feb. 7, 2013, for Chinese Patent Application No. 201110212590.0 (English Summary attached), Publication No. CN 102769365A; available at the European Patent Register at https://register.epo.org; 6 pages.
English translation of the First Examination Report issued by the State Intellectual Property Office of the P.R. China, dated Feb. 7, 2013, for Chinese Patent Application No. 2011102123590.0, Publication No. CN 102769365A; available at the European Patent Register at https://register.epo.org; 5 pages.
Second Examination Report (Chinese language) issued by the State Intellectual Property Office of the P.R. of China, dated Apr. 2, 2013, for Chinese Patent Application No. 201110212590.0 (English Summary attached), Publication No. CN 102769365A; available at the European Patent Register at https://register.epo.org; 6 pages.
English translation of the Second Examination Report issued by the State Intellectual Property Office of the P.R. China, dated Apr. 2, 2013, for Chinese Patent Application No. 201110212590.0, Publication No. CN 102769365A; available at the European Patent Register at https://register.epo.org; 5 pages.
Third Examination Report (Chinese language) issued by the State Intellectual Property Office of the People's Republic of China, dated Jun. 20, 2013, for Chinese Patent Application No. 201110212590.0 (English summary attached), Publication No. CN 102769365A; available at the European Patent Register at https://register.epo.org; 5 pages.
English translation of the Third Examination Report issued by the State Intellectual Property Office of the P.R. China, dated Jun. 20, 2013, for Chinese Patent Application No. 201110212590.0, Publication No. CN 102769365A; available at the European Patent Register at https://register.epo.org; 6 pages.

Search Report issued by the State Intellectual Property Office of the P.R. China, dated Jan. 24, 2013, for Chinese Patent Application No. 201110212590.0; Publication No. CN 102769365A; available at the European Patent Register at https://register.epo.org; 2 pages.
Supplemental Search Report issued by the State Intellectual Property Office of the P.R. China, dated Mar. 25, 2013, for Chinese Patent Application No. 201110212590.0, Publication No. CN 102769365A; available at the European Patent Register at https://register.epo.org; 1 page.
Examination Report (Chinese language) issued by the State Intellectual Property Office of the P.R. China, dated Feb. 8, 2013, for Chinese Patent Application No. 201110223492.7, Publication No. CN 102790502A; available at the European Patent Register at https://register.epo.org; 4 pages.
English translation of the Examination Report issued by the State Intellectual Property Office of the P.R. China, dated Feb. 8, 2013, for Chinese Patent Application No. 201110223492.7, Publication No. CN 102790502A; available at the European Patent Register at https://register.epo.org; 5 pages.
Search Report issued by the State Intellectual Property Office of the P.R. China, dated Jan. 31, 2013, for Chinese Patent Application No. 201110223492.7, Publication No. CN 102790502A; available at the European Patent Register at https://register.epo.org; 1 page.
Supplemental Search Report issued by the State Intellectual Property Office of the P.R. China, dated Nov. 1, 2013, for Chinese Patent Application No. 201110223492.7, Publication No. CN 102790502A; available at the European Patent Register at https://register.epo.org; 1 page.
Examination Report (Chinese language) issued by the State Intellectual Property Office of the P.R. China, dated Feb. 1, 2013, for Chinese Patent Application No. 201110224896.8, Publication No. CN 102761183A; available at the European Patent Register at https://register.epo.org; 8 pages.
English translation of the Examination Report issued by the State Intellectual Property Office of the P.R. China, dated Feb. 1, 2013, for Chinese Patent Application No. 201110224896.8, Publication No. CN 102761183A; available at the European Patent Register at https://register.epo.org; 9 pages.
Search Report issued by the State Intellectual Property Office of the P.R. China, dated Jan. 23, 2013, for Chinese Patent Application No. 201110224896.8, Publication No. CN 102761183A; available at the European Patent Register at https://register.epo.org; 4 pages.
First Examination Report (Chinese language) issued by the State Intellectual Property Office of the P.R. China, dated Mar. 8, 2013, for Chinese Patent Application No. 201110224391.1, Publication No. CN 102801235A; available at the European Patent Register at https://register.epo.org; 5 pages.
English translation of the First Examination Report issued by the State Intellectual Property Office of the P.R. China, dated Mar. 8, 2013, for Chinese Patent Application No. 201110224391.1, Publication No. CN 102801235A; available at the European Patent Register at https://register.epo.org; 7 pages.
Second Examination Report (Chinese language) issued by the State Intellectual Property Office of the P.R. China, dated May 15, 2013, for Chinese Patent Application No. 201110224391.1, Publication No. CN 102801235A; available at the European Patent Register at https://register.epo.org; 4 pages.
English translation of the Second Examination Report issued by the State Intellectual Property Office of the P.R. China, dated May 15, 2013, for Chinese Patent Application No. 201110224391.1, Publication No. CN 102801235A; available at the European Patent Register at https://register.epo.org; 5 pages.
Search Report issued by the State Intellectual Property Office of the P.R. China, dated Feb. 28, 2013, for Chinese Patent Application No. 201110224391.1, Publication No. CN 102801235A; available at the European Patent Register at https://register.epo.org; 1 page.
First Examination Report (Chinese language) issued by the State Intellectual Property Office of the P.R. China, dated Feb. 16, 2013, for Chinese Patent Application No. 201110224882.6 (English Summary attached), Publication No. CN 102780291A; available at the European Patent Register at https://register.epo.org; 8 pages.

(56) References Cited

OTHER PUBLICATIONS

English translation of the First Examination Report issued by the State Intellectual Property Office of the P.R. China, dated Feb. 16, 2013, for Chinese Patent Application No. 201110224882.6, Publication No. CN 102780291A; available at the European Patent Register at https://register.epo.org; 8 pages.
Second Examination Report (Chinese language) issued by the State Intellectual Property Office of the P.R. China, dated Apr. 18, 2013, for Chinese Patent Application No. 201110224882.6, Publication No. CN 102780291A; available at the European Patent Register at https://register.epo.org; 6 pages.
English translation of the Second Examination Report issued by the State Intellectual Property Office of the P.R. China, dated Apr. 18, 2013, for Chinese Patent Application No. 201110224882.6, Publication No. CN 102780291A; available at the European Patent Register at https://register.epo.org; 7 pages.
Search Report issued by the State Intellectual Property Office of the P.R. China, dated Feb. 1, 2013, for Chinese Patent Application No. 201110224882.6, Publication No. CN 102780291A; available at the European Patent Register at https://register.epo.org; 2 pages.
Supplemental Search Report issued by the State Intellectual Property Office of the P.R. China, dated Apr. 10, 2013, for Chinese Patent Application No. 201110224882.6, Publication No. CN 102780291A; available at the European Patent Register at https://register.epo.org; 1 page.
Examination Report (Chinese language) issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.
English translation of the Examination Report issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.
Search Report issued by the State Intellectual Property Office of the P.R. China, dated Dec. 25, 2012, for Chinese Patent Application No. 201110224395.X, Publication No. CN 102761182A; available at the European Patent Register at https://register.epo.org; 1 page.

* cited by examiner

MOTOR ROTOR AND MOTOR HAVING SAME

CROSS-REFERENCE TO RELATED APPLICATIONS

The present application is the national phase of International Application No. PCT/CN2011/079059, titled "MOTOR ROTOR AND MOTOR HAVING SAME", filed on Aug. 29, 2011, which claims the benefit of priority to Chinese Patent Application No. 201110224391.1, entitled "MOTOR ROTOR AND MOTOR HAVING SAME", filed with the Chinese State Intellectual Property Office on Aug. 5, 2011, both of which applications are incorporated herein in their entireties by this reference.

TECHNICAL FIELD

The present application relates to the technical field of motors, and in particular to a motor rotor and a motor having the same.

BACKGROUND

Permanent magnetic assisted synchronous reluctance motor as a new-style permanent magnet motor combines advantages of the permanent magnet motor and the synchronous reluctance motor, and has advantages of high power density, wide speed adjustable range, high efficiency, small volume, and etc., thus has a bright application prospect. A formula of the electromagnetic torque of the permanent magnetic assisted synchronous reluctance motor is as follows:

$$T = mp(L_q - L_d)i_d i_q + mp\psi_{PM} i_q.$$

In the above formula, T is an output torque of a motor, the performance of the motor can be improved by increasing the value of T; the first item in the equation following T is the reluctance torque, and the second item is the permanent magnet torque; $\psi_{PM}$ is the maximum value of stator-rotor coupling magnetic flux generated by a permanent magnet of the motor, m is a phase number of a conductor of a stator, $L_d$ and $L_q$ are inductances along axis d and axis q respectively, wherein axis d refers to an axis coincided with an axis of the main magnetic pole, and axis q refers to an axis perpendicular to the axis of the main magnetic pole, the perpendicular relationship refers to perpendicularity of electrical angles, and $i_d$ and $i_q$ are components of an armature current in the directions of axis d and axis q respectively.

In the prior art, the performance of the motor is generally improved by improving the performance of the permanent magnet, that is, by increasing the permanent magnet torque to increase the value of the resultant torque so as to improve the efficiency of the motor, and the common method is to use rare-earth permanent magnets. However, since rare earth is a non-renewable resource and is expensive, the widespread use of this kind of motor is restricted. Additionally, the urgent demand of further improving the motor efficiency can not be met by only improving the performance of the permanent magnet. Further, if the permanent magnet is inserted into the motor, a tensile deformation or even a fracture may happen at the edge of the rotor operated at high speed.

SUMMARY

The present application provides a motor rotor having an improved structure strength and a motor having the same.

The motor rotor according to one aspect of the present application includes an iron core and a permanent magnet arranged inside the iron core, multiple groups of mounting grooves are arranged in the iron core along a circumferential direction of the iron core, and each group of mounting grooves includes two or more than two mounting grooves arranged at intervals in a radial direction of the iron core; multiple groups of permanent magnets are provided, and permanent magnets in each group of permanent magnets are correspondingly embedded into corresponding mounting grooves in each group of mounting grooves; and an island-shaped region is provided between the outmost layer of the mounting grooves and a periphery of the iron core, the island-shaped region has a reinforcing hole, a reinforcing rod is arranged inside the reinforcing hole, and end portions of the reinforcing rod are connected via a reinforcing member.

Further, the reinforcing hole is a through hole arranged in the rotor, the reinforcing rod is a rivet, and the rivet passes through the through hole and is riveted to the reinforcing member.

Further, the island-shaped region of each group of mounting grooves is provided with the reinforcing hole.

Further, the reinforcing member is a fixing plate arranged on both ends of the iron core, and the reinforcing rod passes through the reinforcing hole and is connected to the fixing plate.

Further, in an inward direction from the periphery of the iron core, a distance L between an edge of each mounting groove in each group of mounting grooves and the periphery of the iron core increases gradually.

Further, in a case that each group of mounting grooves includes two layers of mounting grooves, in the inward direction from the periphery of the iron core, a distance between an edge of the outmost mounting groove and the periphery of the iron core is La, and a distance between an edge of the mounting groove adjacent to the outmost mounting groove and the periphery of the iron core is Lb, wherein, $2La \geq Lb \geq 1.1La$.

Further, each group of mounting grooves includes three or more than three mounting grooves arranged at intervals in the radial direction of the iron core.

Further, in an outward direction from a center of the iron core, distances between edges of three mounting grooves, starting from the mounting groove closest to the center of the iron core, and the periphery of the iron core are respectively Lc, Lb and La, wherein, $2Lb \geq Lc \geq 1.2Lb$, $2La \geq Lb \geq 1.1La$.

According to an aspect of the present application, a motor is further provided, which includes a motor stator and the motor rotor, wherein the motor rotor is arranged inside of the motor stator.

Further, the motor further includes a fixing plate, and a rivet passes through the fixing plate and the iron core to connect the fixing plate to the rotor.

Further, a distance between an inner circumference of the motor stator and a periphery of the motor rotor is n, and $0.35 \text{ mm} \leq n \leq 0.55 \text{ mm}$.

In the motor rotor and the motor having the same according to the present application, the island-shaped region is formed between the outmost layer of the mounting grooves and the periphery of the iron core, the island-shaped region is provided with the reinforcing hole, and the reinforcing rod is arranged inside the reinforcing hole, thereby enhancing the structural strength of the whole rotor. The reinforcing hole and the reinforcing rod are arranged in the rotor without changing the magnetic flux path of the rotor, which greatly enhances the structural strength of the rotor and reduces the deformation of the rotor operated at a high speed, thereby minimizing a clearance between a stator and the rotor, and improving the performance of the motor.

BRIEF DESCRIPTION OF THE DRAWINGS

The accompanying drawings constituting a part of the present application are provided to help further understanding the present application, and the illustrative embodiments and the description thereof are used to interpret the present application and do not constitute inappropriate limitations to the present application.

DETAILED DESCRIPTION

Figure 1:
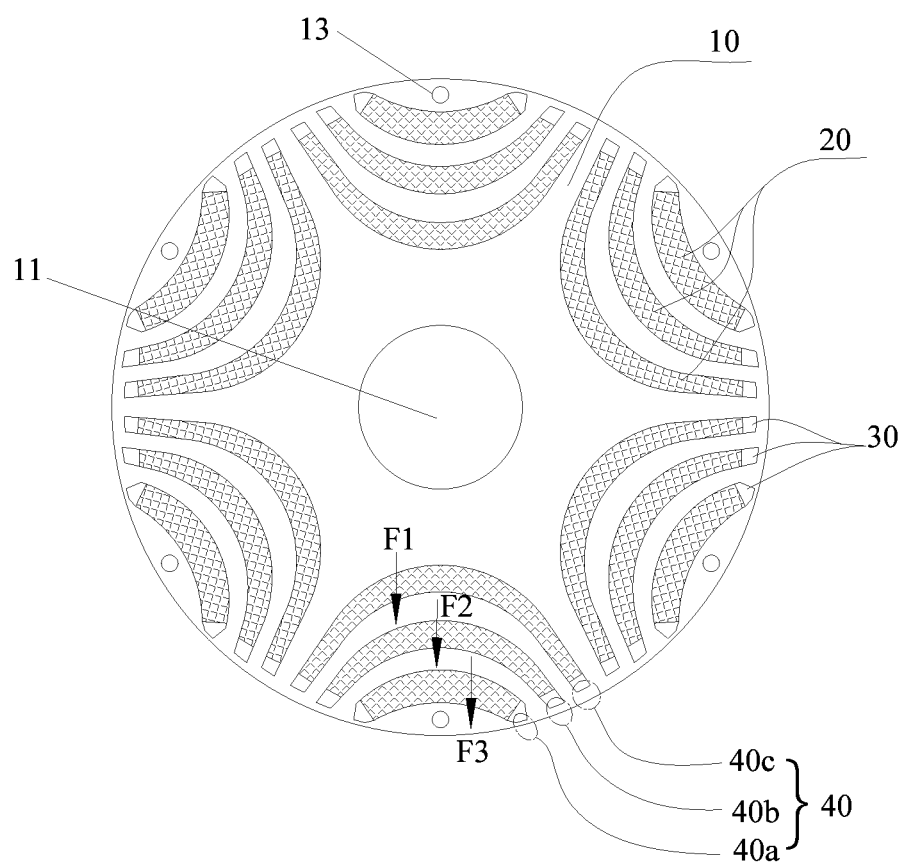
FIG. 1 is a schematic view showing the structure of a motor rotor according to the present application.

The present application is described in detail hereinafter in conjunction with drawings and embodiments.

A motor rotor according to the present application includes an iron core 10 and a permanent magnet 20 arranged inside the iron core 10. Multiple groups of mounting grooves 30 are arranged in the iron core 10 along the circumferential direction of the iron core 10, and each group of mounting grooves 30 includes two or more than two mounting grooves 30 arranged at intervals in the radial direction of the iron core 10. There are multiple groups of permanent magnets 20, and permanent magnets 20 in each group of permanent magnets 20 are correspondingly embedded into corresponding mounting grooves 30 in each group of mounting grooves 30. There is an island-shaped region 12 between the outmost layer of the mounting grooves 30 and a periphery of the iron core 10, the island-shaped region 12 has a reinforcing hole 13, a reinforcing rod 60 is arranged inside the reinforcing hole 13, and end portions of the reinforcing rod 60 are connected via a reinforcing member.

Figure 3:
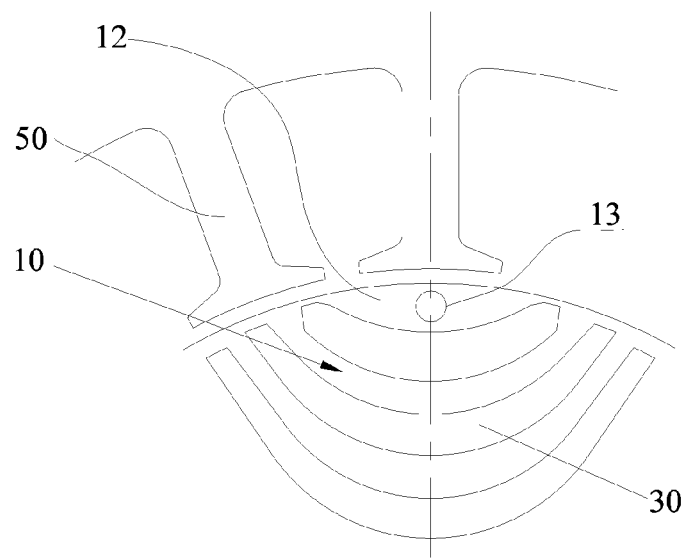
FIG. 3 is a schematic view showing a partial structure of the motor rotor according to the present application.
Figure 4:
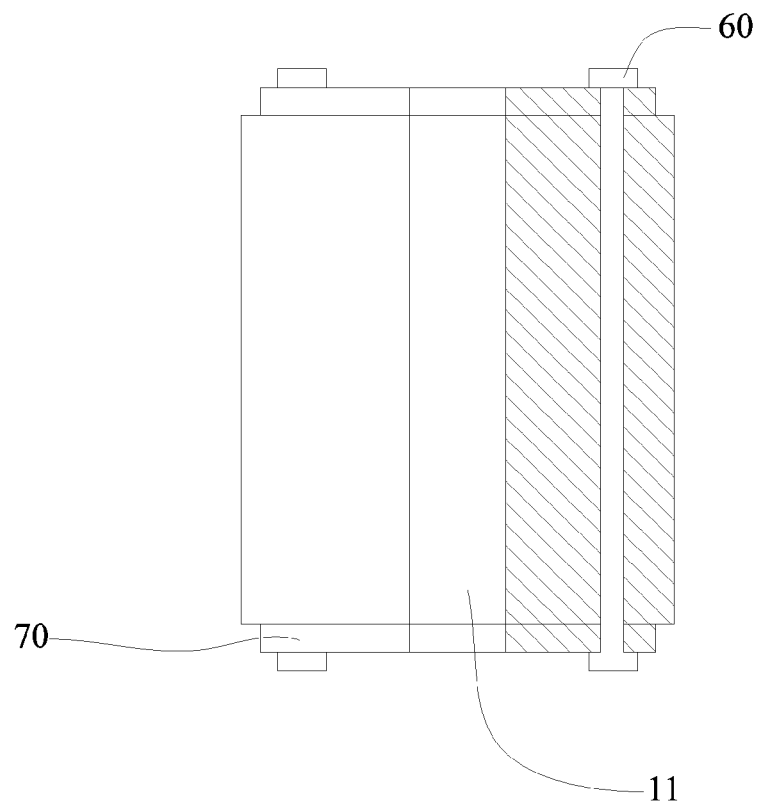
FIG. 4 is a schematic view showing a strengthening structure of the motor rotor according to the present application.
Figure 5:
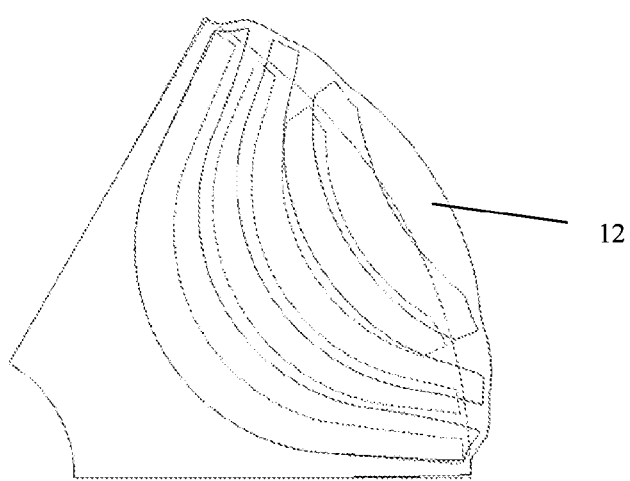
FIG. 5 is a schematic view showing the deformation of the motor rotor operated at a high speed according to the present application.

As shown in FIGS. 1 and 3, the island-shaped region 12 is formed between the outmost layer of the mounting grooves 30 and the periphery of the iron core 10. As shown in FIG. 5, a portion of the motor rotor having the maximum deformation is the island-shaped region of the outmost layer of through grooves. As shown in FIGS. 3 and 4, the reinforcing hole 13 is arranged on the island-shaped region 12 in a symmetric line of a mounting groove of the permanent magnet in the rotor, and the reinforcing rod 60 is arranged inside the reinforcing hole 13, and end portions of each reinforcing rod 60 are connected via the reinforcing member, thereby enhancing the structural strength of the whole rotor. The island-shaped region 12 of each group of mounting grooves 30 may be provided with the reinforcing hole 13 to further enhance the structural strength of the rotor. The reinforcing hole 13 and the reinforcing rod 60 are arranged in the rotor without changing the magnetic flux path of the rotor, which greatly enhances the structural strength of the rotor and reduces the deformation of the rotor operated at a high speed, thereby minimizing a clearance between a stator and the rotor, and improving the performance of the motor. Preferably, the reinforcing member is a fixing plate 70 arranged at both ends of the iron core 10, and the reinforcing rod 60 passes through the reinforcing hole 13 and is connected to the fixing plate 70.

For further enhancing the mechanical strength of the rotor, the reinforcing hole 13 is a through hole arranged in the rotor, and the reinforcing rod 60 is a rivet which passes through the through hole and is riveted to the reinforcing member.

The reinforcing hole 13 passing through the rotor is arranged in the symmetric line of the mounting groove 30 of the rotor, and the rivet passing through the reinforcing hole 13 is riveted to the reinforcing member. Preferably, as shown in FIG. 4, two ends of the iron core 10 of the rotor are both provided with the fixing plate 70, the rivet passes through the fixing plates 70 at two ends of the iron core and the island-shaped region 12 on the rotor to fixedly connect the fixing plates 70 and the rotor together. The deformation of the island-shaped region may be more strictly limited due to the restriction of the rivet passing through the island-shaped region, thereby further enhancing the mechanical strength of the rotor. In other embodiments, the reinforcing rod 60 may also be a bolt threadedly connected to the reinforcing hole 13, and a center of the iron core of the rotor is provided with a rotor axle hole 11.

Figure 2:
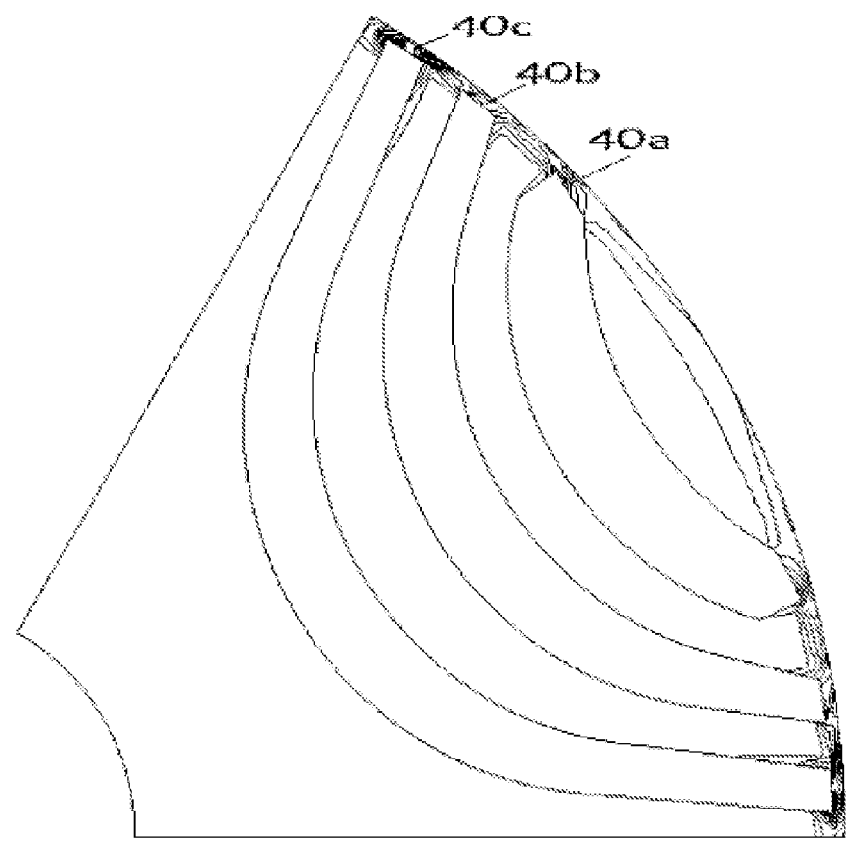
FIG. 2 is a schematic view showing the stress distribution of the motor rotor operated at a high speed according to the present application.

PA As shown in FIG. 1, when the rotor is operated at a high speed, centrifugal forces generated by each layer of the permanent magnets 20 are respectively F1, F2 and F3, the centrifugal force is in a radial direction of the rotor, and the centrifugal forces respectively act on arc-shaped silicon steel sheets adjacent to each layer of the permanent magnets 20, i.e. areas indicated by arrows in FIG. 1. Wherein, reference numerals 40a, 40b and 40c respectively refer to magnetic shielding bridges at intersecting portions between each layer of through grooves of permanent magnets and the periphery of the rotor, the magnetic shielding bridges are used to connect each layer of mounting grooves 30 and shield the magnetic leakage at end portions of each layer of permanent magnets 20. Centrifugal forces F1, F2 and F3 are balanced with reversed tensions of 40a, 40b and 40c. As shown in FIG. 2, which is a schematic view showing the stress distribution of the motor rotor operated at the high speed, the magnetic shielding bridge 40c bears a stress larger than the magnetic shielding bridges 40a and 40b, thus is a position where deformation and fracture are most likely to occur.

The deformation at the edge of the rotor depends on a width of the magnetic shielding bridge 40 at the periphery of the rotor, and when the magnetic shielding bridge 40 is wide, the rotor may have a high mechanical strength, thus the motor may work at a higher speed, however, the negative effect is that the magnetic leakage at end portions of the permanent magnets 20 may increase, which may reduce the effective magnetic flux in the stator and the rotor, and cause the performance degradation of the motor.

Figure 6:
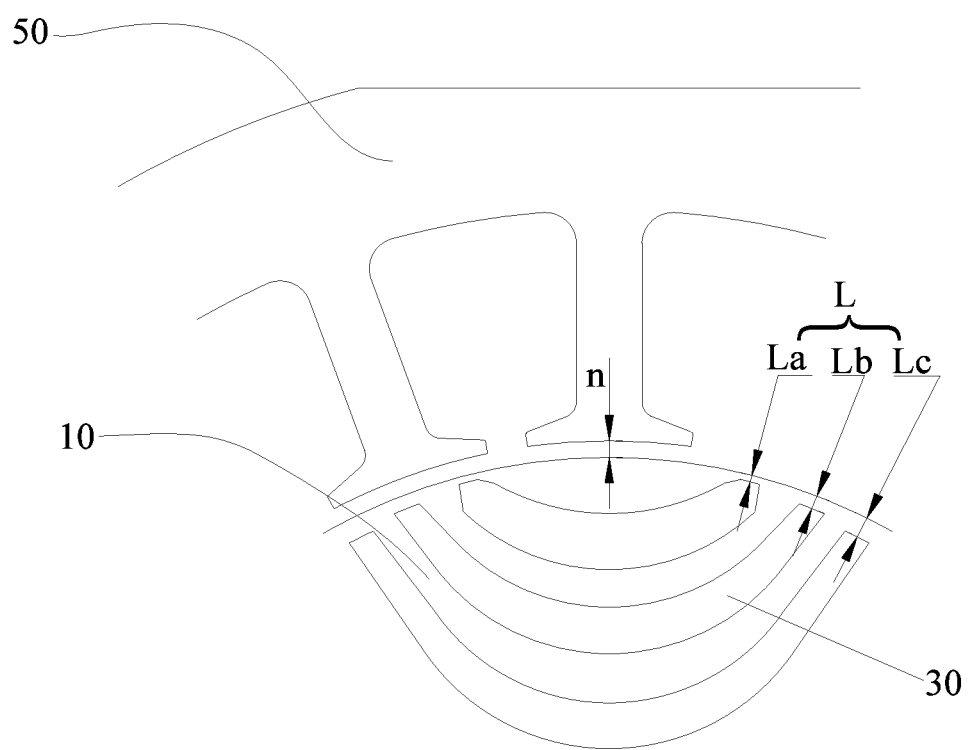
FIG. 6 is a schematic view showing the structure of a stator and a rotor of the motor according to the present application.

The present application optimizes the magnetic shielding bridge formed between the mounting groove 30 and the periphery of the rotor, and particularly for each group of mounting grooves having a multilayer structure, the magnetic shielding bridges 40 are designed to have different widths, and the magnetic shielding bridges 40 are designed to have gradient widths. As shown in FIG. 6, in a direction from the periphery to a rotation axes of the iron core 10, a distance L between the edge of each mounting groove 30 in each group of mounting grooves 30 and the periphery of the iron core 10 increases gradually.

When each group of mounting grooves 30 includes two layers of permanent magnets 20, in an inward direction from the periphery of the iron core 10, a distance between the edge of the outmost mounting groove 30 and the periphery of the iron core 10 is La, and a distance between the edge of the mounting groove 30 adjacent to the outmost mounting groove 30 and the periphery of the iron core is Lb, wherein, $2La \geq Lb \geq 1.1La$.

As shown in FIG. 6, when each group of mounting grooves 30 includes three or more than three mounting grooves 30 arranged at intervals in the radial direction of the iron core 10, in the inward direction from the periphery of the iron core, the distances between the edges of three mounting grooves 30 starting from the mounting groove 30 at the outmost side and the periphery of the iron core are respectively La, Lb and Lc, wherein, $2Lb \geq Lc \geq 1.2Lb$, and $2La \geq Lb \geq 1.1La$.

As shown in FIG. 5, which is a schematic view showing the deformation of the motor rotor operated at the high speed (dotted lines show the structure of the rotor in a stationary state, and solid lines show the structure of the deformed rotor), the island-shaped region at the outmost layer of the magnetic steel has the maximum deformation, that the rotor has a tensile deformation in the direction of the symmetry axis of the mounting groove 30, and when the value of L satisfies the above relationship, the deformation is less than 20 μm, and the stress of the magnetic shielding bridge 40 may be in a safe scope.

Thus, when each group of mounting grooves 30 includes three or more than three layers of mounting grooves 30 arranged at intervals in the radial direction of the iron core 10, the distances between the edges of the mounting grooves 30 and the periphery of the iron core 10 also satisfy the above relationship of $2La \geq Lb \geq 1.1La$ (here, in an outward direction from the center of the iron core 10, the distances between the edges of two mounting grooves and the periphery of the iron core 10 are respectively Lb and La). In this case, the above two numerical range limits may be employed separately, and may also be employed jointly, which both may enhance the mechanical strength of the rotor and reduce the deformation of the rotor operated at the high speed.

The present application further provides a motor including a motor stator 50 and the above motor rotor, wherein the motor rotor is arranged inside the motor stator 50. The motor also includes a fixing plate 70, and a rivet passes through the fixing plate 70 and an iron core 10 to connect the fixing plate 70 to the rotor. A distance between an inner circumference of the motor stator 50 and a periphery of the motor rotor is n, wherein, $0.35 \text{ mm} \leq n \leq 0.55 \text{ mm}$.

The deformation at the edge of the rotor depends on the width of the magnetic shielding bridge at the periphery of the rotor, and when the magnetic shielding bridge is wide, the rotor may have a high mechanical strength, thus the motor may work at a higher speed, however, the negative effect is that the magnetic leakage at end portions of the permanent magnets may increase, which may cause the performance degradation of the motor. The present application optimizes the magnetic shielding bridge formed between the magnetic steel groove and the periphery of the rotor, and particularly for the multilayer structure, the magnetic shielding bridges are designed to have gradient widths, thereby effectively enhancing the mechanical strength of the rotor, and reducing the deformation of the rotor operated at the high speed.

Furthermore, the island-shaped region 12 at the outmost layer of the mounting grooves 30 is provided with the reinforcing hole, two ends of the iron core 10 of the rotor are both provided with the fixing plate 70, a bolt or a rivet passes through the fixing plates 70 at two ends of the iron core and the island-shaped region to fixedly connect the fixing plates 70 and the iron core 10 together. Without changing the magnetic flux path of the rotor, the present application greatly enhances the structural strength of the rotor and reduces the deformation of the rotor operated at a high speed, thereby minimizing a clearance between a stator and the rotor, and improving the performance of the motor.

Thus, when a distance n between the stator 50 and the rotor which has multilayer embedded permanent magnets is designed to be smaller, the magnetic flux loss may be reduced, thereby improving the performance of the motor. Based on practical test results, when the value of n satisfies an expression of $0.35 \text{ mm} \leq n \leq 0.55 \text{ mm}$, the performance and deformation of the motor can meet the reliability requirement.

Based on the above description, the embodiments of the present description realize the following technical effects.

The motor rotor and the motor having the same define the appropriate width of the magnetic shielding bridge of the rotor and the characteristic of the width of the magnetic shielding bridge when the rotor has a multilayer structure, and the fixing plates at two sides of the rotor and the island area at the outmost layer of the iron core of the rotor are integrally connected, thereby enhancing the structural strength of the rotor and improving the reliability of the rotor, and the clearance between the rotor and the stator may be made smaller, which further improves the performance of the motor.

The embodiments described hereinabove are only preferred embodiments of the present application, and should not be interpreted as limitation to the present application. For the person skilled in the art, many modifications and variations may be made to the present application. Any modifications, equivalent replacements and improvements made within the spirit and principle of the present application are also deemed to fail into the protection scope of the present application.

What is claimed is:

1. A motor rotor, comprising an iron core and a permanent magnet arranged inside the iron core, wherein,
    multiple groups of mounting grooves are arranged in the iron core along a circumferential direction of the iron core;
    multiple groups of permanent magnets are provided, and permanent magnets in each group of permanent magnets are correspondingly embedded into corresponding mounting grooves in each group of mounting grooves;
    an oval-shaped region is provided between the outmost layer of the mounting grooves and a periphery of the iron core, the oval-shaped region has a reinforcing hole, a reinforcing rod is arranged inside the reinforcing hole, and end portions of the reinforcing rod are connected via a reinforcing member; and
    in an inward direction from the periphery of the iron core, a distance L between an edge of each mounting groove in each group of mounting grooves and the periphery of the iron core increases gradually;
    each group of mounting grooves comprises three or more than three mounting grooves arranged at intervals in the radial direction of the iron core; and
    in an outward direction from a center of the iron core, distances between edges of three mounting grooves, starting from the mounting groove closest to the center of the iron core, and the periphery of the iron core are respectively Lc, Lb and La, wherein, $2Lb \geq Lc \geq 1.2Lb$, and $2La \geq Lb \geq 1.1La$.

2. The motor rotor according to claim 1, wherein, the reinforcing hole is a through hole arranged in the rotor, the reinforcing rod is a rivet, and the rivet passes through the through hole and is riveted to the reinforcing member.

3. The motor rotor according to claim 1, wherein, the oval-shaped region of each group of mounting grooves is provided with the reinforcing hole.

4. The motor rotor according to claim 1, wherein, the reinforcing member is a fixing plate arranged on both ends of the iron core, and the reinforcing rod passes through the reinforcing hole and is connected to the fixing plate.

5. A motor comprising a motor stator and the motor rotor, wherein, the motor rotor is arranged inside of the motor stator, and the motor rotor comprises an iron core and a permanent magnet arranged inside the iron core, wherein, multiple groups of mounting grooves are arranged in the iron core along a circumferential direction of the iron core;

multiple groups of permanent magnets are provided, and permanent magnets in each group of permanent magnets are correspondingly embedded into corresponding mounting grooves in each group of mounting grooves; and an oval-shaped region is provided between the outmost layer of the mounting grooves and a periphery of the iron core, the oval-shaped region has a reinforcing hole, a reinforcing rod is arranged inside the reinforcing hole, and end portions of the reinforcing rod are connected via a reinforcing member; and in an inward direction from the periphery of the iron core, a distance L between an edge of each mounting groove in each group of mounting grooves and the periphery of the iron core increases gradually;

each group of mounting grooves comprises three or more than three mounting grooves arranged at intervals in the radial direction of the iron core; and in an outward direction from a center of the iron core, distances between edges of three mounting grooves, starting from the mounting groove closest to the center of the iron core, and the periphery of the iron core are respectively Lc, Lb and La, wherein, $2Lb \geq Lc \geq 1.2Lb$, and $2La \geq Lb \geq 1.1La$.

6. The motor rotor according to claim 5, further comprising a fixing plate, wherein a rivet passes through the fixing plate and the iron core to connect the fixing plate to the rotor.

7. The motor rotor according to claim 5, wherein, a distance between an inner circumference of the motor stator and a periphery of the motor rotor is n, and $0.35 \text{ mm} \leq n \leq 0.55 \text{ mm}$.

* * * * *